Fig. 1

INVENTOR.
ROBERT A. KLEIST
BY
Edward A. Robinson
Attorney

Aug. 6, 1963  R. A. KLEIST  3,100,040
CONVEYOR SORTING

Filed Dec. 27, 1960  5 Sheets-Sheet 2

INVENTOR.
ROBERT A. KLEIST
BY Edward A. Robinson
Attorney

INVENTOR.
ROBERT A. KLEIST
BY Edward A. Robinson
attorney

Aug. 6, 1963   R. A. KLEIST   3,100,040
CONVEYOR SORTING

Filed Dec. 27, 1960   5 Sheets-Sheet 4

INVENTOR.
ROBERT A. KLEIST
BY *Edward A. Robinson*
*Attorney*

Fig. 9

INVENTOR.
ROBERT A. KLEIST
BY Edward A. Robinson
Attorney

United States Patent Office 3,100,040
Patented Aug. 6, 1963

3,100,040
CONVEYOR SORTING
Robert A. Kleist, Sunnyvale, Calif., assignor to General Precision, Inc., Binghamton, N.Y., a corporation of Delaware
Filed Dec. 27, 1960, Ser. No. 78,538
11 Claims. (Cl. 198—38)

This invention relates to conveyor arrangements for sorting articles of mail or the like, and more particularly, this invention relates to memory and control devices associated with conveyors for storing digitally coded information and for causing the conveyors to discharge articles at selected locations in accordance with the coded information.

Traditionally, mail sorting has been accomplished by postal clerks who selectively place various articles of mail into pigeon holes or into a bank of mail bags or the like. With each operation, a clerk determines which of the possible pigeon holes is the proper sort location for the article, and then he must physically locate and insert the article into that sort location. In such an arrangement the total number of pigeon holes or the like must be limited such that all are within convenient reach of the sorting clerk. A mail clerk's efficiency and speed of sorting as well as the number of possible sort locations may be increased by use of a machine or conveyor arrangement which will receive successive articles of mail at a single location and will transport each article to a selected one of many possible sort locations some of which may be remote from the physical position of the sorting clerk.

It has been proposed to provide multiple conveyor systems using one or more primary conveyors which receive articles from one or more operator input stations, and which transfer each article to a selected one of several secondary conveyors. Each secondary conveyor may discharge each respective article at a selected one of several discharge locations. The desired sorting location of each article of mail or the like, may be initially entered by means such as a keyboard manipulated by the mail clerk, whereupon the conveyor system will transport the article to a final sorting destination. If the conveyor system includes a plurality of input stations each manned by a different postal clerk, means must be provided to avoid an interference situation which may arise when two clerks independently key sorting instructions request simultaneous use of the same bucket or transport holder of the same secondary conveyor. In this interference situation the instructions of one input station must be given priority and the second input station must wait until another conveyor bucket is available.

It is an object of this invention to provide an improved memory device which may be attached to and carried by each bucket of a conveyor, the memory device being adapted to receive digitally coded information from an input station and operable to cause the bucket to discharge its contents at a selected one of a plurality of discharge locations in accordance with the coded information stored therein.

A further object of this invention is to provide an improved memory device utilizing magnetic bodies which are shiftably mounted on a conveyor bucket; and more specifically, it is an object to provide a plurality of permanent bar magnets positioned in guideways extending in the direction of movement of the conveyor and to provide a stationary electromagnet which may be selectively energized as the conveyor bucket passes thereover to selectively hold and shift the bar magnets rearwardly with respect to the conveyor movement.

Another object of this invention is to provide an improved memory device and a readout means responsive to the memory device, and more particularly, it is an object to provide a plurality of shiftable magnetic bodies mounted on a conveyor such that a first configuration or pattern is formed when all of the bodies are in a "reset" position and whereby a modified pattern is formed when one or more of the bodies are shifted into a "set" position—the readout means being provided by a plurality of magnetic switches which are arranged according to a configuration or pattern corresponding to a desired pattern of the magnetic bodies.

A further object of this invention is to provide an electrical circuit for control of a multiple conveyor system wherein the contents of conveyor buckets must be inserted into, transferred between, and discharged from conveyor buckets in synchronism with the movement of the conveyor; and more particularly, it is an object to provide a magnetic memory device and a magnetic switch arrangement which will sense information from the memory in the form of a timed voltage pulse, which pulse may be used to synchronize the operation of the control circuits.

Numerous other objects and advantages will be apparent throughout the progress of the specification which follows. The accompanying drawings illustrate a certain selected embodiment of the invention and the views thereof are as follows.

Briefly stated, according to this invention, one or more operators may place articles of mail or the like upon input gates at operator input stations A, B or C associated respectively with primary conveyors 11, 12 and 13. Each article carried by the primary conveyors 11, 12 and 13 is selectively discharged onto secondary conveyors 14, 15, 16, 17 and 18 which in turn selectively discharge the articles into chutes or mail sacks at sorting destinations 20. Both the primary conveyors 11, 12 and 13 and the secondary conveyors 14 through 18 are of the bucket type having especially adapted holders known as buckets for carrying the articles. Each bucket carries a memory device 21 (see FIGURES 4 and 5) upon which an operator may impress digital information by means such as a keyboard 22, 23 or 24, FIGURE 1. A portion of the information is encoded upon the memory device of a bucket of the respective primary conveyor and a further portion of the information is encoded upon the memory device of the bucket of the secondary conveyor which will receive the article from the primary conveyor. The magnetic memory includes a plurality of magnets 25 (see FIGURES 5 and 6) which are shiftable along the direction of movement of the conveyor. A readout from the memory may be accomplished by magnetic switches 26 positioned to magnetically co-act and respond to the magnets 25 as the shoe 21 passes along a rail 28. To encode information upon the memory magnet 25, an electromagnet 29 (FIGURE 6) may be energized to co-act with and hold the permanent magnet 25 as the shoe 21 passes thereover. The magnet 25 will be selectively shifted from a forward "reset" position to a rearward "set" position. Readout of the information may be accomplished by a pattern of magnetic switches all of which will close when a corresponding pattern of magnets is carried thereacross by the shoe 21.

Figure 1:
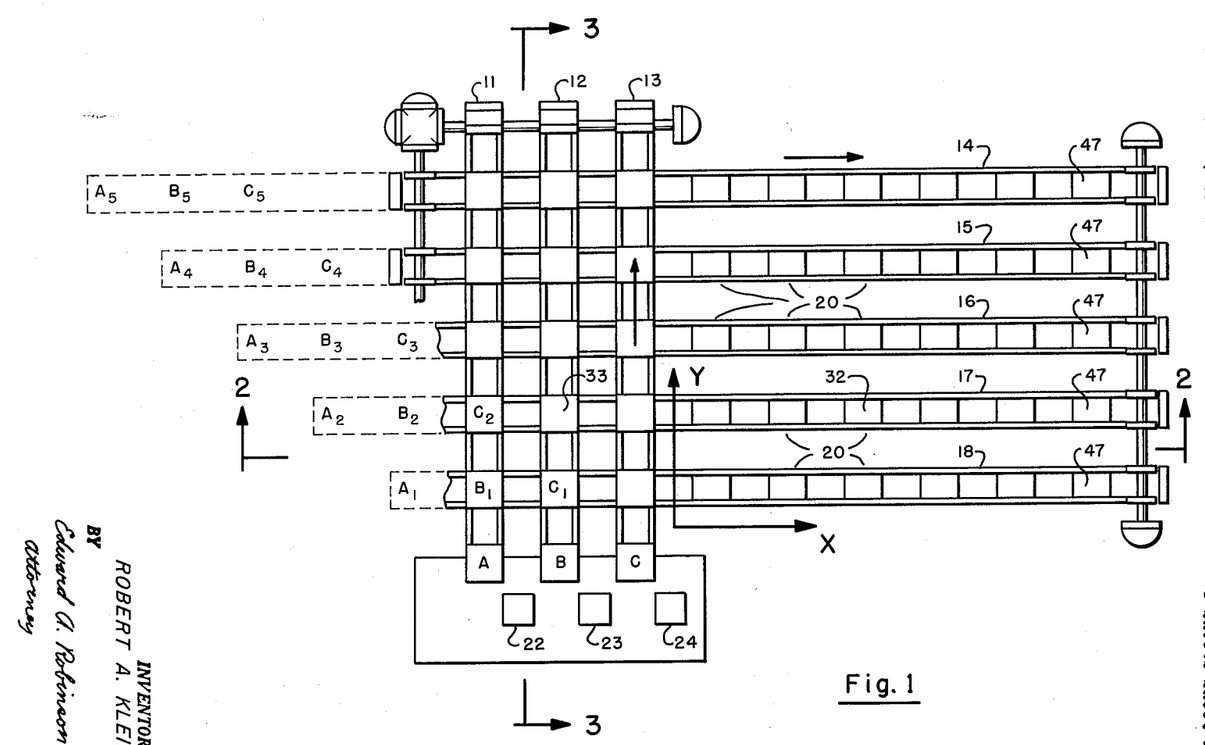
FIGURE 1 is a plan view of a conveyor system of this invention including a development or apparent extension of the conveyor to provide memory input stations.

FIGURE 1 shows an arrangement of three primary conveyors and five secondary conveyors. With this arrangement three postal clerks may simultaneously operate the input stations A, B and C and sort articles of mail into any of twenty-five sort destinations 20 indicated in an X—Y co-ordinate system. FIGURE 1 shows a rather simplified arrangement to provide an understanding of this invention, but it will be appreciated that the configuration may be greatly enlarged by increasing the number of both primary and secondary conveyors, and by increasing the number of discharge locations along each of the secondary conveyors. Thus, by increasing the number of primary conveyors, the number of input stations may be correspondingly increased to facilitate an increased number of postal clerks. Similarly, by increasing the number of secondary conveyors and the number of discharge locations associated with each secondary conveyor, the total number of sorting destinations may be greatly increased.

As shown in FIGURE 1, three operators or postal clerks at the positions A, B and C may place successive articles upon input gates for the conveyors 11, 12 and 13 and may enter successive digital sorting instructions into the system by the keyboards 22, 23 and 24. An input gate which may be in the form of a trap door 31 will be synchronized with the conveyor by means to be discussed subsequently. When the conveyor system is able to accept the article of mail, the trap door 31 (see FIGURE 3) will open permitting the article to descend into a bucket or tray 31' of a primary conveyor. As the trap door opens, the coded information from the keyboard is impressed upon two memory devices—a first associated with the respective primary conveyor 11, 12 or 13 and a second associated with a particular one of the secondary conveyors 14 through 18. For example, if the article is being directed to a particular mail sack or chute 32 at a discharge location on the secondary conveyor 17, the operator at the input station B will enter the coded destination information via the keyboard 23 upon the memory devices of a primary conveyor bucket at the operator input location B and upon a secondary conveyor bucket at a memory input location $B_2$, FIGURE 1. Since all of the conveyors move synchronously, the primary conveyor bucket from input station B will move to a transfer point 33 in the same time required for the secondary conveyor bucket to move from the station $B_2$ to that same transfer point 33. The transfer point 33 constitutes a discharge location for the primary conveyor 12 and an article input location for the secondary conveyor 17. The memory device of the primary conveyor bucket is encoded to cause that bucket to discharge its contents at the location 33, and the memory device of the secondary conveyor bucket is encoded to cause that bucket to discharge its contents at the location 32.

As shown in FIGURE 1, the memory input locations of the secondary conveyors are designated by a letter corresponding to the associated operator input locations A, B and C, and by a subscript corresponding to the respective secondary conveyor as numbered from the operator input stations. As will be described subsequently, each of the operator input stations A, B and C are electrically connected to all of the correspondingly lettered memory input stations whereby timing pulses indicating the availability of secondary conveyor buckets are passed to the operator input stations, and whereby coded signals for setting the memory device are passed from the operator input stations to selected memory input stations. The memory input locations of those conveyors more remote from the operator input stations A, B and C are shifted progressively to the left as shown in the developed view, FIGURE 1, since the timing must be such that a primary conveyor bucket will move from an operator input station through each successive transfer location in the same time required for the secondary conveyor buckets to move from corresponding memory input stations to those transfer locations.

Figure 2:
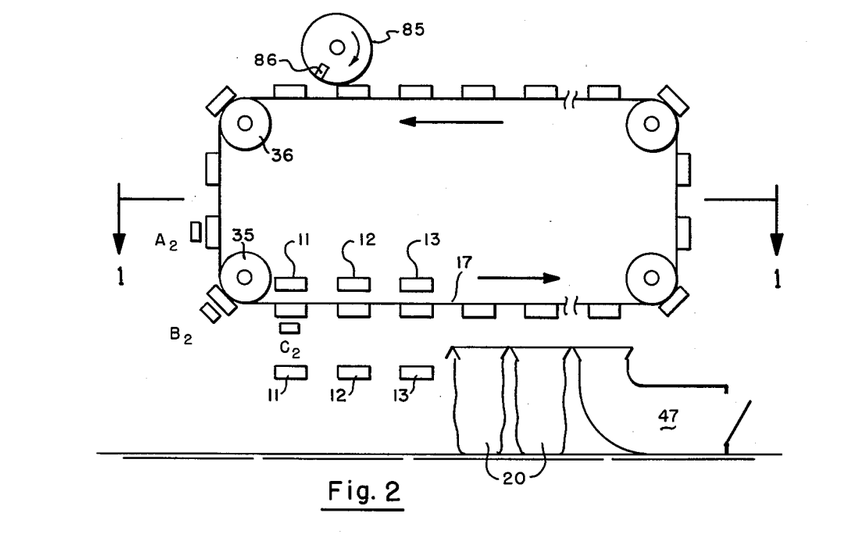
FIGURE 2 is a vertical elevational view looking along the plane 2—2 of FIGURE 1.

It is not contemplated that the conveyors 14 through 18 be physically extended to accommodate the necessary memory input stations; but rather these stations may be positioned around end sprockets 35 and 36 and may double back along the return span of the conveyor chain. FIGURE 2 indicates the locations of the memory input stations associated with the secondary conveyor 17, and it will be noted that these stations extend upwardly around the end sprocket 35. Since no articles will be carried by the conveyor prior to the first transfer locations or intersections with the first primary conveyor 11, it is of no consequence that the conveyor buckets are in an inclined or inverted position and the memory devices may be encoded prior to the loading of the buckets.

Figure 4:
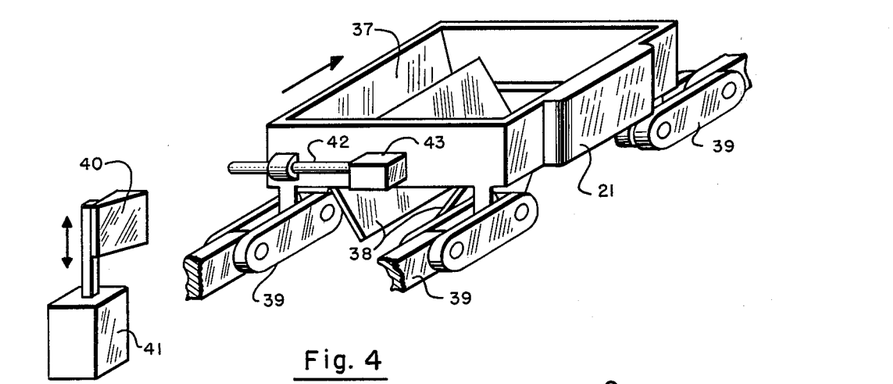
FIGURE 4 is a fragmentary perspective view showing a single conveyor bucket with a trap door means for discharging its contents.

FIGURE 4 shows an example of a conveyor bucket which could be used with this invention. The conveyor bucket may have a peripheral frame 37, generally tray shaped, and with trap doors 38 normally forming the bottom, but capable of opening to discharge the contents thereof. The conveyor bucket is attached to conveyor chains 39 and is adaptable for movement as a part of the chains around sprockets and such. The bucket of FIGURE 4 could be used upon the primary conveyors 11, 12 and 13 whereon the tray portion generally rides above the chains 39. The secondary conveyors 14 through 18 are shown as they may pass upwardly around sprockets for a return span, and therefore, the corresponding buckets would probably be adapted with upwardly extending lugs or attachments for the conveyor chains such that the tray portion be suspended slightly below the chains.

The bucket shown in FIGURE 4 may be opened to discharge its contents by an oblique cam surface 40 selectively positioned by a solenoid 41. If the solenoid 41 positions the surface 40 properly in a vertical direction, a push rod 42 of a passing conveyor is engaged and moved to the right to release a latch mechanism 43 holding the trap doors 38. The release trip mechanism 40—41 is in a stationary position adjacent the conveyor such that the contents of the bucket will drop into a desired discharge location either along the primary or the secondary conveyor.

Figure 3:
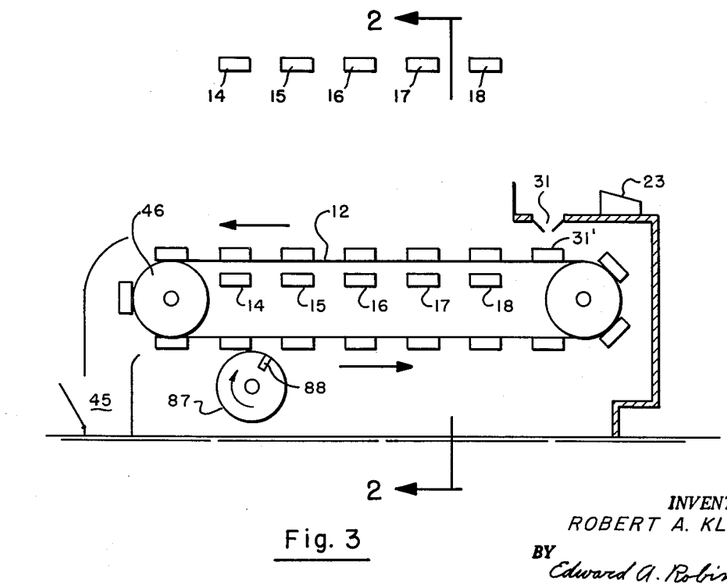
FIGURE 3 is a vertical section looking along the plane 3—3 of FIGURE 1.

Provision must be made for the ejectment from the conveyors of all articles improperly retained, either due to malfunctioning of the apparatus or to an operator's error in keying the information into the system. As shown in FIGURE 3, the buckets of the conveyor 12 may selectively discharge articles to any of the conveyors 14 through 18, but failing to do so, the articles will be discharged into a bin 45 as the buckets move around an end sprocket 46 to an inverted position. Each secondary conveyor moves past a plurality of possible discharge locations 20 (see FIGURE 2), but in the event that an article inadvertently remains in a bucket after all of the normal discharge locations 20 have been passed, a final bin 47 is provided for the ejectment of the article. While all of the normal discharge locations 20 are provided with a selective solenoid arrangement 40—41, the final location may be provided with a similar cam surface 40 which is permanently mounted to trip the latch 43 of any and all of the buckets not previously tripped.

Figure 5:
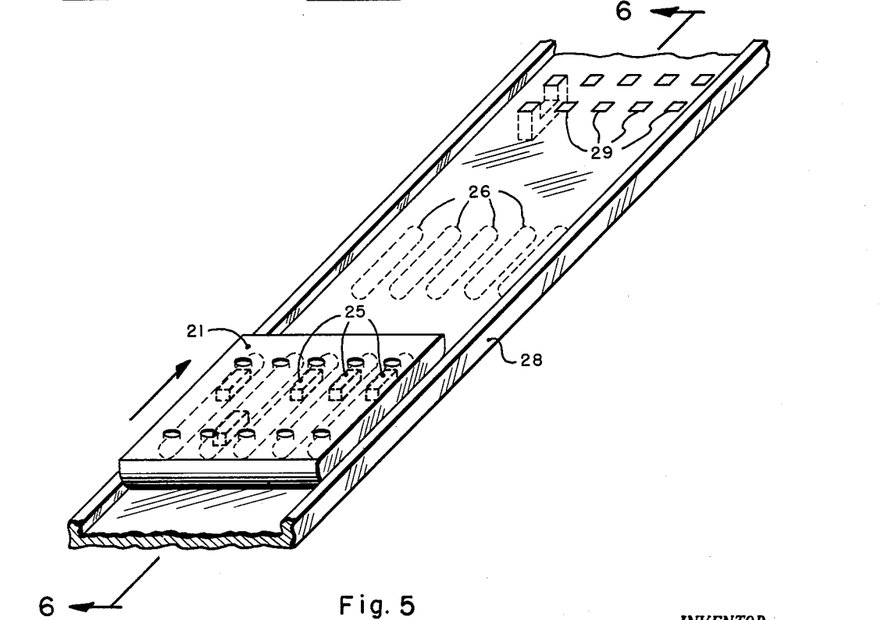
FIGURE 5 is another fragmentary perspective view showing the memory device of this invention as it may be incorporated into a shoe moving along a flanged rail.
Figure 6:
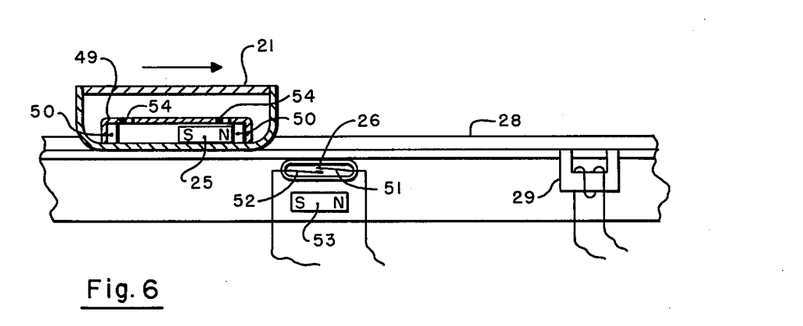
FIGURE 6 is a sectional view looking along the plane 6—6 of FIGURE 5.

The memory device 21 may be mounted on the side of a bucket as shown in FIGURE 4, or in any other convenient location. As shown in FIGURES 5 and 6 the memory device comprises a shoe movable along a stationary rail of nonmagnetic material such as aluminum or brass. This arrangement will permit the permanent bar magnets 25 of the device 21 to move into close spaced relation with both the magnetic sensing switches 26 and with the holding magnets 29. It may be appreciated that this invention can be used in other forms wherein the bistable magnets 25 are carried into spaced relation with both the sensing switches and the input magnets without using a shoe slidable along a rail.

The specific bistable device shown in FIGURE 6 includes a bar magnet 25 slidable within a guideway 49 having end blocks 50 of a magnetic material such as soft iron. The magnetic end blocks 50 cause the devices to become bistable since the magnet 25 will be retained at either end of the guideway 49 by a nominal magnetic force which may be overcome by a stronger magnetic force. The initial or reset position of the magnet is in the forward end of the guideway 49 as shown in FIGURE 6. When energized, the electromagnet 29 will co-act with and hold the shiftable magnet 25 as the shoe 21 moves thereacross, whereby the magnet 25 is caused to shift rearwardly with respect to the shoe 21 and the bucket associated therewith. On the other hand, if the electromagnet is not energized, the bistable magnet 25 will remain in the forward end of the guideway 49. Thus, the bistable magnet 25 is "reset" initially in the forward end of the guideway 49, and may be "set" by the selective energizing of the electromagnet 29 which will selectively shift the magnet to the rear end of the guideway. The guideway 49 may loosely contain the shiftable magnet 25 with openings 54 provided at each end to eliminate damping effects which could result from air trapped within the cylinder. Thus, the magnet 25 will be free to shift rapidly from one end of the guideway 49 to the other without substantial damping.

The switch 26 contains a pair of resilient magnetizable elements which are normally separated from each other to open an electrical circuit. When subjected to a magnetic field, the elements 51 and 52 become oppositely polarized and attract each other. Thus when a magnetic field is applied, the natural resilience of the elements is overcome by the magnetic forces whereupon the elements close upon each other and close the associated electrical circuit. Magnetic switches of this type are sold commercially and a full description thereof appears in an article entitled "Magnetization and Pull Characteristics of Mating Magnetic Reeds" by R. L. Peek, Jr., published in The Bell System Technical Journal, vol. XL, No. 2, March 1961, beginning on page 523. FIGURE 6 indicates that an auxiliary magnet 53 may be used to provide a threshold biasing if the magnet 25 of the bistable device 50 is not in itself sufficiently strong to close the contacts. The position of the biasing magnet 53 may be adjustable to insure proper operation of the switch 26 and may be eliminated entirely if the bistable magnets 25 are strong enough and can be spaced closely enough to operate the switches 26 without threshold biasing.

Figure 7:
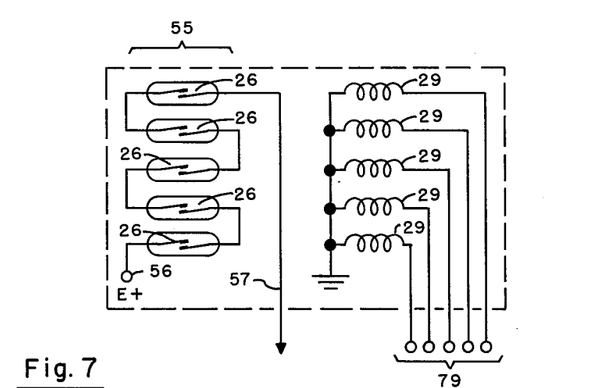
FIGURE 7 is an electrical schematic diagram of a memory input station indicated by blocks on FIGURE 1.

FIGURE 7 indicates schematically the arrangement of elements at each of the memory input stations $A_1$, $A_2$ ..., $B_1$, $B_2$ ..., etc., shown in FIGURE 1. The elements of FIGURE 7 are mounted in a stationary position (also shown in FIGURE 5) and the memory device 21 of each conveyor bucket passes thereacross from left to right. Five magnetic switches are aligned for sensing the availability of the conveyor buckets for use by an operator at the input stations A, B and C. If the memory device 21 of the bucket is in a completely reset position, all of the magnets 25 will be aligned in the forward position of each respective guideway. If the magnets are so aligned, all of the magnetic switches 26 in a configuration or pattern 55 will operate simultaneously as the memory device passes thereover and a reference voltage E+ from a terminal 56 will be passed through all of the switches, which are connected in series, to an output lead 57. On the other hand, if previous information has been stored in the memory device, at least one of the magnets 25 will have been shifted rearwardly destroying the alignment, and all of the switches 26 will not operate simultaneously and the voltage from the terminal 56 will not be applied to the output lead 57.

It may be appreciated that the serially connected switches 26 arranged in alignment as shown in 55 or in any other predetermined pattern will constitute a readout device providing a pulse only when the magnets 25 are aligned or in a similar pattern to that of the switches. It may be further appreciated that the voltage pulse appearing on the output lead 57 not only indicates the availability of the specific bucket in question (no previous information stored therein) but further provides a timing signal synchronized with the movement of the conveyor for initiating an operation of an electrical control circuit, which itself will be synchronized with the movement of the conveyor.

Figure 8:
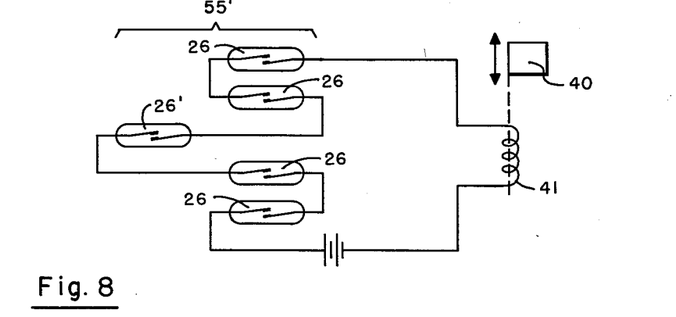
FIGURE 8 is an electrical schematic diagram of a selective discharge station likewise shown as blocks in FIGURE 1.

FIGURE 8 shows a readout configuration of magnetic switches 26 connected in a circuit to control the operation of a solenoid 41 to effect the discharge of the contents of conveyor buckets at a particular discharge location. In FIGURE 8 the switches 26 are arranged in a pre-determined configuration 55' wherein certain of the switches are aligned corresponding to a forward position of the magnets 25 and wherein at least one of the switches 26' is displaced rearwardly with respect to the direction of movement of the conveyor to sense the presence of a magnet 25 which may have been set or shifted rearwardly in its bucket location. The particular configuration of switches 55' provides a digital readout for all buckets of the conveyor which must discharge their contents at the location controlled by the solenoid 41 and the shiftable cam plate 40. Obviously, if a bucket passes this discharge location with the appropriate code registered by the configuration of the shiftable magnets 25, a circuit will be completed through all of the switches 26—26' such that the solenoid 41 will be energized. The configuration of switches 55' shown in FIGURE 8 may cause buckets encoded accordingly to discharge their contents at a specific location. Obviously, other switch configurations will be provided for other discharge locations, and each such configuration will be responsive to a corresponding encoding upon any of the memory devices. In practice, it may be desirable that the solenoid 41 be operated for a discrete period of time following the switch closures. This may be accomplished electrically by an appropriate delay circuit or it may be accomplished mechanically making use of inertia effects associated with the solenoid armature and of the connected cam plate 40 associated therewith.

Figure 9:
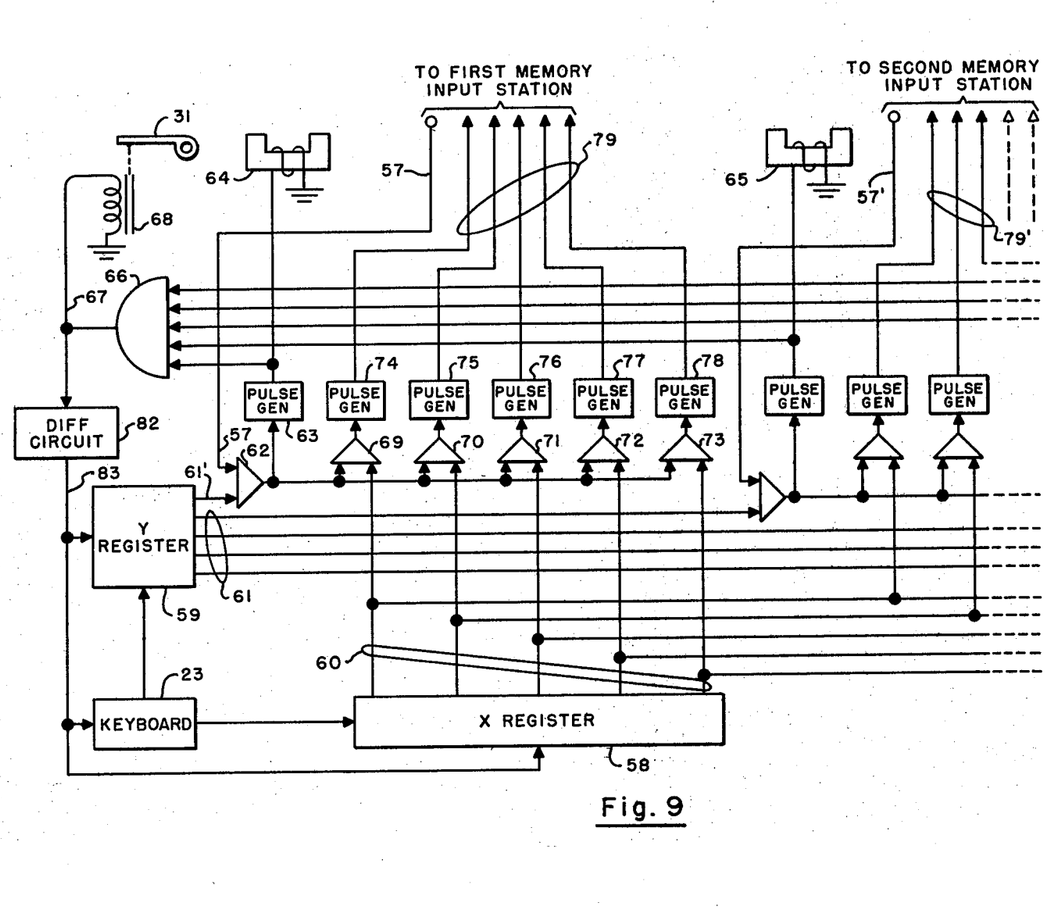
FIGURE 9 is an electrical schematic diagram of an operator input station associated with each of the primary conveyors.

FIGURE 9 shows a schematic diagram for the operator input stations A, B and C. As the operator places an article of mail on the input gate or trap door 31, the sorting destination is keyed serially on a keyboard 23. The first portion of the information concerns the X sorting position of the article, and is entered into an X register 58, and the second portion of the information concerns the Y sorting position of the article and is entered into the Y register 59. The X and Y registers may be any convenient storage circuit known in the computer art, for example, a ring counter of the type shown and described on page 89 of a text entitled "Digital Computer Components and Circuits" by R. K. Richards, published in 1957 by the D, Van Nostrand Company, Inc. A specific one of the output leads 60 from the register 58 will pass an appropriate voltage corresponding to a desired discharge location of any of the secondary conveyors 14 through 18. Similarly, an appropriate one of the output leads 61 from the Y register 59 will correspond to a desired discharge location from the primary conveyors 11, 12 and 13 and will similarly correspond to one of the secondary conveyors 14 through 18. Thus, if we view FIGURE 1 as having X and Y coordinates as indicated by the arrows, any desired sorting output location 20 may be defined in accordance with the X and Y coordinates. Such a coordinate system may constitute the coded information entered from the keyboard 23 into X register 58 and the Y register 59.

As previously indicated, the information is keyed serially such that the X register is set initially and the Y register is set secondly. Therefore, when an appropriate voltage appears on an output lead 61 from the Y register, it is assumed that the keying operation is complete and that the X register has been previously set to provide a corresponding voltage at an output terminal 60. When a voltage appears at a specific one of the Y output leads, for example, 61′, an AND gate 62 will be conditioned to pass a timed voltage pulse from a lead 57 which is the output lead from the configuration of switches 26 of FIGURE 7. The AND gate 62 as well as the further AND gates of FIGURE 9 may be of any conventional nature, for example, see page 38 of the Richards text supra. This reference also shows and describes the operation of an OR gate to be discussed later. The AND gate 62 functions to pass the timed voltage pulses from the lead 57, when conditioned by the appropriate voltage on the lead 61′. The voltage passed by the AND gate 62 is directly coupled to a monostable or single shot multivibrator or pulse generator 63. This pulse generator and the others of FIGURE 9 may be of any conventional type, for example, see the figures and description beginning on page 172 of the Richards text supra. The monostable multivibrator 63 will pass a voltage pulse for a predetermined duration of time after the triggering pulse obtained from the lead 57, and a magnet 64 will thereby be energized for a limited duration of time. The magnet 64 is physically positioned in alignment with other magnets 65 etc., to selectively set the shiftable bistable magnets 25 of the primary conveyors 11, 12 or 13. Thus, it will be appreciated that a particular one of several magnets 64, 65 etc. will be energized in response to the coded information of the Y register, and that the magnets so energized will be synchronized by the timed pulse from an appropriate lead 57 to encode a primary conveyor bucket for discharge of its contents onto a selected one of the secondary conveyors.

An OR gate 66 will receive voltage pulses whenever any one of the magnets 64, 65 etc. are energized, and said pulses will be passed via a lead 67 to energize a solenoid 68 coupled to operate the input gate or trap door 31 at the particular operator input station. Thus, regardless of the sorting destination of a particular article of mail, the trap door 31 will be opened to permit passage of that article of mail to the respective primary conveyor. Operation of the solenoid 68 and trap door 31 will be initiated from the timed voltage pulse of the lead 57 and will therefore be synchronized with the operation of the conveyor system. As previously indicated, the appearance of a timed voltage pulse on the lead 57 indicates the availability of a specific bucket on the secondary conveyor. If no bucket is immediately available for an operator's use, the X and Y registers will continue to furnish voltages to condition the appropriate AND gates until a bucket becomes available and furnishes an appropriate timed voltage pulse.

As stated heretofore, the X register will supply an appropriate voltage to a selected one of the leads 60 and will condition a selected one of the AND gates 69 through 73 to pass a voltage pulse. Thus, when the timed pulse from the lead 57 is passed by the AND 62, a selected one of the AND gates 69 through 73 will likewise pass that timed pulse and a selected one of the monostable multivibrators or pulse generators 74 through 78 will pass a voltage pulse over a selected one of the leads 79 to a memory input station of a secondary conveyor. Referring to FIGURE 7, we may note that each of the leads 79 will connect with a respective one of the magnets 29 as indicated in FIGS. 5 and 6. The energizing of a magnet 29 will result in the setting of a particular bistable magnet 25 carried by a bucket of the secondary conveyor, and that bucket will be caused to discharge its contents accordingly.

The schematic diagram of FIGURE 9 shows the gates and pulse generators located at a particular input station A, B or C which are electrically connected to particular memory input stations of the secondary conveyor $A_1$, $A_2$, $A_3$, etc. Thus, the group of leads 57 and 79 of FIGURE 9 are the same leads 57 and 79 of FIGURE 7 which shows schematically any one of the secondary conveyor memory input stations. Similarly, another group of leads 57′—79′ will connect to another memory input station having an identical circuit. It will be appreciated that FIGURE 9 may be extended such that control pulses will be passed over similar groups of leads to each of the secondary memory stations controlled by the respective operation station. Thus if we deem FIGURE 9 to represent operator input stations B, then similar groups of leads 57—79, 57′—79′, etc. electrically connect with each of the stations $B_1$, $B_2$, $B_3$, $B_4$ and $B_5$.

Since there is no possibility that any of the memory devices 21 of the secondary conveyor buckets be encoded with information prior to passing memory input stations $A_1$, $A_2$, $A_3$, $A_4$ and $A_5$, the schematic diagram of FIGURE 7 could be somewhat simplified for these stations. It is not necessary to check the alignment of the bistable magnets 25 to determine the availability of a bucket, and therefore, a single switch 26 coupled to a supply voltage E+ and positioned to co-act with a single one of the magnets 25 could provide the timing voltage pulse required for the operation of the control circuits of the first operator station A, FIGURE 9. On the other hand, the memory input stations may be mass produced, and it may be more economical to use the single standard configuration of FIGURES 5 and 7 for all such stations.

The monostable multivibrators 63, 74, 75, etc. may be designed to supply voltage pulses of any desired duration time and for purposes of this invention the pulse will be initiated as a shoe 21 passes over a group of magnetic switches 26 (see FIGURES 5 and 6) and must be of sufficient duration to insure that a selected magnet 29 is energized as the shoe 21 passes thereover. The pulse will be terminated at a time subsequent to the passage of the shoe 21 but before the next subsequent conveyor bucket will approach the memory input station. A differentiating circuit 82 will sense the termination or lagging edge of the pulse and will supply a reset pulse to a lead 83 which is coupled to both the X and Y registers 58 and 59, and with the keyboard 23. Thus, at the conclusion of the memory input operation, the registers are set for the next subsequent operation and the keyboard 23 is conditioned to again receive information from the operator.

Alternatively, a voltage pulse to reset the registers and keyboard may be generated in a manner similar to the timed pulse of lead 57. Another magnetic switch 26 may be positioned subsequent to one of the magnets 29 and connected to a supply voltage, FIGURES 5 and 6. This switch would provide a voltage reset pulse after the shoe 21 has passed over the magnets 29 and the memory set operation is completed. If a voltage reset pulse were generated, flip-flop circuits could be used in lieu of the pulse generator circuits 63, 74, 75, etc., and the flip-flops could be reset after each operation.

The X and Y registers 58 and 59 together with the gates 62, 69, 70 etc., constitute a means for developing a code representative of a particular discharge location. Upon appearance of a timing pulse via a lead 57, the code circuit causes particular pulse generators 63, 74, 75 etc. to set selected bits in conveyor memory devices. The particular code developed by the apparatus of FIGURE 9 may be deemed a "1-out-of-5", since in each encoding operation one selected bistable magnet 25 is set out of a possible five bistable magnets available. It may be appreciated that other codes are available using combinations of one, two or more magnets being set simultaneously. Indeed, other codes such as the binary code would be far less wasteful of "bit capacity"; i.e., the binary code would serve many more discharge locations with the same number of bistable magnets providing unique bit combinations for each discharge location. Using the binary code, five bits will provide 31 unique combinations, whereas the same five bits in the 1-out-of-5 code produce but five combinations. If the conveyor system were to be expanded to include more conveyors and more discharge locations per conveyor, it would be advantageous to use a code other than the 1-out-of-5 code developed by the apparatus of FIGURE 9.

As stated heretofore, the magnets 25 are initially in a forward or reset position, and are caused to be shifted rearwardly when coded information is set thereon. After a conveyor bucket has completed its operation of discharging an article into a selected discharge location, it is necessary that the memory device be reset prior to the next operation. This function may be accomplished by a moving or rotating magnetic field positioned to co-act with all of the magnetic elements 25. If the magnetic field moves in the same direction as the conveyor but at a speed in excess thereof, each of the magnets 25 will be pulled forwardly to the reset position. FIGURE 2 shows a rotating wheel 85 having a magnet 86 mounted at the periphery thereof. The wheel 85 may have a circumference which is twice the pitch or spacing between adjacent buckets of the conveyor, and may be synchronized with the conveyor 17. The circumference of the wheel will move at twice the linear speed of the conveyor, and the magnet 86 will pass over each successive bucket of the conveyor at twice the speed of the bucket. The magnet 86 will throw all of the shiftable magnets 25 forwardly to the reset position within the respective guideways. Similarly, FIGURE 3 shows a wheel 87 having a magnet 88 mounted thereon and operable to reset all of the shiftable magnets 25 associated with each of the primary conveyor buckets in a similar manner.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Sorting apparatus comprising a conveyor having a plurality of buckets thereon, an input station for loading the buckets, a plurality of discharge locations along the conveyor, each bucket having a memory device for a selected one of the discharge locations, said memory device including a plurality of shiftable magnetic bodies, said input station including a controllable magnetic means positioned in spaced relation with each bucket passing through the input station, said magnetic means being operable to selectively set the memory device by shifting selected ones of the magnetic bodies with respect to the bucket.

2. Sorting apparatus comprising a conveyor movable in a forward direction and having a plurality of buckets thereon, an input station for loading the buckets, a plurality of discharge locations along the conveyor, each bucket adapted to receive an article and to discharge the article at a selected one of the discharge locations, each bucket having a memory device for selection of the discharge location, said memory device including a magnetic body shiftable with respect to the bucket along the direction of movement of the conveyor, said input station including a controllable magnetic field generating means positioned adjacent to the conveyor and in spaced relation to the path of the shiftable magnetic body, said magnetic field generating means being operable to selectively hold the magnetic body and to cause said body to shift rearwardly with respect to the conveyor movement.

3. Sorting apparatus comprising a conveyor movable in a forward direction and having a plurality of buckets thereon, an input station for loading the buckets, a plurality of discharge locations along the conveyor, each bucket being operable to receive an article and to discharge the article at a selected one of the discharge locations, each bucket having a memory device for selection of the discharge location, said memory device including a magnetic body shiftable with respect to the bucket along the direction of movement of the conveyor, said input station including a controllable magnetic field generating means for selectively setting the memory device, said magnetic means being positioned adjacent to the conveyor and being operable to selectively hold the magnetic body and to cause said body to shift rearwardly with respect to the bucket due to the forward movement of the conveyor, and a magnetic reset device positioned adjacent to the conveyor, said magnetic reset device being operable to generate a magnetic field movable in the forward direction of and at a velocity in excess of the movement of the conveyor whereby the magnetic body is pulled forwardly to a reset position with respect to the bucket.

4. Sorting apparatus comprising a conveyor movable in a forward direction and having a plurality of buckets thereon, an input station for loading the buckets, a plurality of discharge locations along the conveyor, each bucket being operable to carry an article and to discharge the article at a selected one of the discharge locations, each bucket having a memory device including a plurality of magnetic bodies shiftable with respect to the bucket along the direction of movement of the conveyor, said input station including controllable magnetic field generating selection means for selectively setting the memory device, said magnetic means being positioned adjacent to the conveyor and being operable to magnetically hold at least one of the magnetic bodies in accordance with a selection code and to thereby cause the selected body to shift rearwardly with respect to the bucket which is moved forwardly past the magnetic selection means, and discharge means responsive to the relative position of the magnetic bodies of the memory device and operable to cause the bucket to discharge the article at the selected discharge location corresponding to a code established by the shifted body.

5. Sorting apparatus in accordance with claim 4 comprising a magnetic reset means positioned adjacent to the conveyor, said reset means being operable to generate a movable magnetic field for co-acting with the shiftable bodies of the memory device, the magnetic field of the reset means being movable forwardly with respect to the conveyor at a rate in excess of the movement of the conveyor whereby each of the magnetic bodies is shifted to a forward position with respect to the conveyor bucket.

6. Sorting apparatus comprising a movable conveyor having a plurality of buckets thereon, an input station for loading the buckets, a plurality of discharge locations along the conveyor, each bucket being operable to carry an article and to discharge the article at a selected one of the discharge locations, each bucket having a memory device including a magnetic body shiftable axially along the direction of movement of the conveyor, a memory input station including controllable magnetic selection means for setting the memory device by selectively shifting the magnetic body rearwardly with respect to the bucket, and discharge selection means positioned in spaced relation with each discharge location along the conveyor, said discharge selection means including a magnetic switch coupled to an electrical circuit for causing discharge of the article from the bucket, said magnetic switch being positioned to magnetically co-act with the shiftable magnetic bodies and operable to selectively close and render the electrical circuit operative in response to the selective shift position of the magnetic body.

7. Sorting apparatus comprising a movable conveyor having a plurality of buckets theroen, an input station for loading the buckets, a plurality of discharge locations along the conveyor, each bucket being operable to carry an article and to discharge the article at a selected one of the discharge locations, each bucket having a memory device including a plurality of magnetic bodies shiftable axially along the direction of movement of the conveyor, an input station including a controllable magnetic field generating selection means for setting the memory device by shifting selected ones of the magnetic bodies rearwardly with respect to the conveyor movement, and discharge selection means positioned in spaced relation with each discharge location along the conveyor, said discharge selection means including a plurality of magnetic switches coupled to an electrical circuit for causing discharge of the article from the bucket, said magnetic switches being arranged in a pattern for simultaneous operation by magnetically co-acting with the shiftable magnetic bodies, said pattern corresponding with the pattern of magnetic bodies produced when the selected ones of the magnetic bodies have been shifted rearwardly.

8. Sorting apparatus comprising a primary conveyor having a plurality of buckets thereon, a plurality of secondary conveyors each having a plurality of buckets thereon, each bucket being operable to carry an article and to discharge the article at a selected discharge location, the discharge locations of the primary conveyor being arranged as article transfer locations of the secondary conveyors whereby the article is transferred from the primary conveyor to the secondary conveyor, each bucket having a memory device including a plurality of shiftable magnetic bodies, an input station including controllable magnetic selection means for setting the memory devices by shifting selected ones of the magnetic bodies, said input station being controllably coupled to a magnet associated with the primary conveyor and to a corresponding magnet associated with one of the secondary conveyors, and discharge selection means positioned in spaced relation with each discharge location of each conveyor, said discharge selection means including a plurality of magnetic switches coupled to an electrical circuit for discharging of the article from the bucket, said magnetic switches being arranged in a pattern for simultaneous operation by magnetically co-acting with the shiftable magnetic bodies, said pattern corresponding with the pattern of magnetic bodies, the selected ones of which have been shifted.

9. Sorting apparatus comprising a plurality of primary conveyors each having a plurality of buckets thereon, and a plurality of secondary conveyors each having a plurality of buckets thereon, each bucket being operable to carry an article and to discharge the article at a selected one of a plurality of discharge locations, the discharge locations of the primary conveyors being input locations of the secondary conveyors and constituting transfer locations whereby an article may be selectively transferred from a primary conveyor to a secondary conveyor, each bucket having a memory device including a plurality of shiftable magnetic bodies, an input station associated with each of the primary conveyors including control circuits for selectively setting the memory device, a plurality of selective magnets associated with each of the primary conveyors at the input stations, a plurality of further magnets associated with each of the secondary conveyors, said magnets of both primary and secondary conveyors being coupled to the control circuits of the input stations and being operable to hold selected ones of the shiftable magnetic bodies and to cause said selected bodies to shift rearwardly with respect to the bucket, the selective shifting of the bodies constituting a digital code for controlling selection of the discharge locations of both the primary and secondary conveyors.

10. Sorting apparatus in accordance with claim 9 further comprising a plurality of memory input stations associated with each of the secondary conveyors, each memory input station of the secondary conveyors being electrically coupled to a corresponding one of the input stations associated with each of the primary conveyors, said memory input stations including a plurality of magnetic switches for sensing the presence of digital information previously stored in the memory device of each bucket, and further including a plurality of magnets controllably coupled to the control circuits of the input station of the primary conveyor, said control circuit selectively energizing the magnets when no prior digital information is sensed by the magnetic switches.

11. A memory device for a bucket of a conveyor comprising a plurality of permanent bar magnets each shiftably mounted within a guideway extending in the direction of movement of the conveyor, each of said guideways including a magnetic material at each end thereof to provide a holding force whereby the magnet will remain in stable equilibrium in both ends of the guideway, said plurality of guideways being arranged in a configuration such that when all of the shiftable magnets are forwardly positioned in the respective guideways, a pattern is thereby produced constituting a reset condition of the memory device, and whereby any magnets shifted rearwardly in the respective guideways will produce a modified pattern representative of coded digital information.

References Cited in the file of this patent

UNITED STATES PATENTS

| | | |
|---|---|---|
| 737,963 | Reich | Sept. 1, 1903 |
| 1,758,104 | Folker | May 13, 1930 |
| 1,795,787 | Mattingly | Mar. 10, 1931 |
| 1,902,602 | Williams | Mar. 21, 1933 |
| 1,978,737 | Bower | Oct. 30, 1934 |
| 2,079,241 | Burt | May 4, 1937 |
| 2,261,349 | Edelman | Nov. 4, 1941 |
| 2,770,796 | Boer | Nov. 13, 1956 |
| 2,857,059 | Goerlich | Oct. 21, 1958 |
| 2,877,718 | Mittag | Mar. 17, 1959 |
| 2,931,484 | Muller | Apr. 5, 1960 |